US008004833B2

(12) United States Patent
Tseng et al.

(10) Patent No.: US 8,004,833 B2
(45) Date of Patent: Aug. 23, 2011

(54) ELECTRONIC APPARATUS AND HINGE THEREOF

(75) Inventors: Chen Tseng, Kaohsiung (TW); Chao-Hsien Chan, Jhonghe (TW); Shih-Chieh Yang, Bade (TW)

(73) Assignee: Quanta Computer Inc., Tao Yuan Shien (TW)

( * ) Notice: Subject to any disclaimer, the term of this patent is extended or adjusted under 35 U.S.C. 154(b) by 177 days.

(21) Appl. No.: 12/314,643

(22) Filed: Dec. 15, 2008

(65) Prior Publication Data

US 2009/0316348 A1 Dec. 24, 2009

(30) Foreign Application Priority Data

Jun. 20, 2008 (TW) ............................... 97123193 A

(51) Int. Cl.
*H05K 5/00* (2006.01)
*H05K 7/00* (2006.01)
*H04M 1/00* (2006.01)

(52) U.S. Cl. ......... 361/679.55; 361/679.56; 361/679.26; 361/679.27; 361/679.28; 361/679.29; 455/575.1; 455/575.3; 455/575.8

(58) Field of Classification Search ............ 361/679.01, 361/679.02, 679.08, 679.09, 679.3, 679.55–679.59; 345/156, 157, 168, 169, 184; 455/325, 556.1, 455/550.1, 90.1, 575.1; 369/282, 291, 253, 369/44.16, 75.5; 70/357, 367, 406, 381, 491

See application file for complete search history.

(56) References Cited

U.S. PATENT DOCUMENTS 6,044,473 A * 3/2000 Kim .............................. 713/320
6,895,638 B2 * 5/2005 Lin ................................ 16/368
7,526,083 B2 * 4/2009 Kim et al. ................ 379/433.13
2005/0037821 A1 * 2/2005 Takagi ....................... 455/575.3
2005/0288076 A1 * 12/2005 Seol ........................... 455/575.4
2008/0068494 A1 * 3/2008 Kim .............................. 348/374
2009/0103256 A1 * 4/2009 Takeguchi et al. ....... 361/679.27

* cited by examiner

*Primary Examiner* — Jayprakash N Gandhi
*Assistant Examiner* — Jerry Wu
(74) *Attorney, Agent, or Firm* — Thomas, Kayden, Horstemeyer & Risley, LLP

(57) ABSTRACT

The invention discloses a hinge including a first support, a second support, and a sensor. The first support includes a first electrical connection part. The second support includes a second electrical connection part and a protrusion part, and the protrusion part is insulated from the second electrical connection part. The second support is engaged to the first support, and the second electrical connection part detachably and electrically contacts the first electrical connection part. The sensor is respectively and electrically connected to the first electrical connection part and the second electrical connection part. When the first support rotates to a specific position relative to the second support, the first support and the protrusion part are detached. Meanwhile, the sensor correspondingly transmits a signal.

17 Claims, 5 Drawing Sheets

ELECTRONIC APPARATUS AND HINGE THEREOF

BACKGROUND OF THE INVENTION

1. Field of the Invention

The invention relates to a hinge and particularly to a hinge capable of switching a monitor off.

2. Description of the Prior Art

When a laptop is located in an outdoor environment or a place without power outlet, the laptop must be powered by a battery. Therefore, power consumption is one of the most important issues in the design of a laptop. At present, the electronic elements of the laptop and the OS executed by the laptop are persistently developed for the goal of power-saving. Generally, CPU (central processing unit), memory, and monitor consume more power than other electronic elements of the laptop. In order to consume less power, the monitor can be a LED (light emitting diode) panel or an OLED (organic LED) panel, but the power consumption of the monitor is still larger than most electronic elements of the laptop and plays a major role in the sustaining time of battery. However, the sustaining time of battery of the laptop varies according to the power-consumption of the electronic elements and how the user uses the laptop. For example, if the user is temporarily away from the laptop, he can close the monitor, and the sustaining time of the battery can be further increased.

The difference between the laptop and the desktop computer is that the desktop computer has a separated switch for the monitor, and therefore the monitor can be switched off via the separated switch. Generally, the laptop does not have a separated switch for the monitor, but a press switch instead. When the monitor is closed (the monitor rotates towards the body of the laptop), the monitor will press the press switch, and then the sensor electrically connected to the press switch will generate an electronic trigger signal. Afterward, the controller posited in the body of the laptop will switch the monitor off (e.g. the power circuit of the monitor is open) according to the electronic trigger signal. However, the disadvantage of this solution is that the press switch posited on the surface of the body affects the appearance design of the laptop.

Other than the aforesaid solution, the invention modifies the hinge engaged to the monitor and the body, so as to provide another solution capable of shutting the monitor off.

SUMMARY OF THE INVENTION

A scope of the invention is to provide a hinge capable of providing a switch on/off signal for the monitor according to the electrical connection between the elements of the hinge.

Another scope of the invention is to provide an electronic apparatus including a body, a monitor, and a hinge. With the monitor and the body respectively engaged to the hinge, the monitor could rotate relatively to the body. The electronic apparatus selectively switches the monitor off according to the electronic signal transmitted from the hinge.

According to an embodiment, the hinge of the invention includes a first support part, a second support part, and a sensor. The first support part includes a first electrical connection part. The second support part, pivotally connected to the first support part, includes a second electrical connection part and a protrusion part. The second electrical connection part detachably and electrically contacts with the first electrical connection part, and the protrusion part is insulated from the second electrical connection part. The sensor is electrically connected to the first electrical connection part and the second electrical connection part. When the first support part rotates relatively to the second support part to a predetermined position, the first support part and the protrusion part interfere each other; therefore, the first electrical connection part is detached from the second electrical connection part and then the sensor correspondingly transmit a signal.

Furthermore, the second support part includes a fixed axle and a stop part. The stop part is engaged to the fixed axle and includes the second electrical connection part and the protrusion part. The first support part includes a rotating structure and a rotating part. The rotating structure is rotatably engaged to the fixed axle. The rotating part is fixed on the rotating structure and includes the first electrical connection part.

Accordingly, when the first support part rotates relatively to the second support part to a particular position, the first support part is detached from the second support part. Therefore, the electrical connection between the first support part and the second support part varies at the particular position. Therefore, the sensor electrically connected to the first support part and the second support part can transmit an electronic signal to the controller in the electronic apparatus. The controller then selectively switches the monitor off according to the electronic signal. Furthermore, the electronic apparatus of the invention can achieve the goal of selectively switching the monitor off via the hinge.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
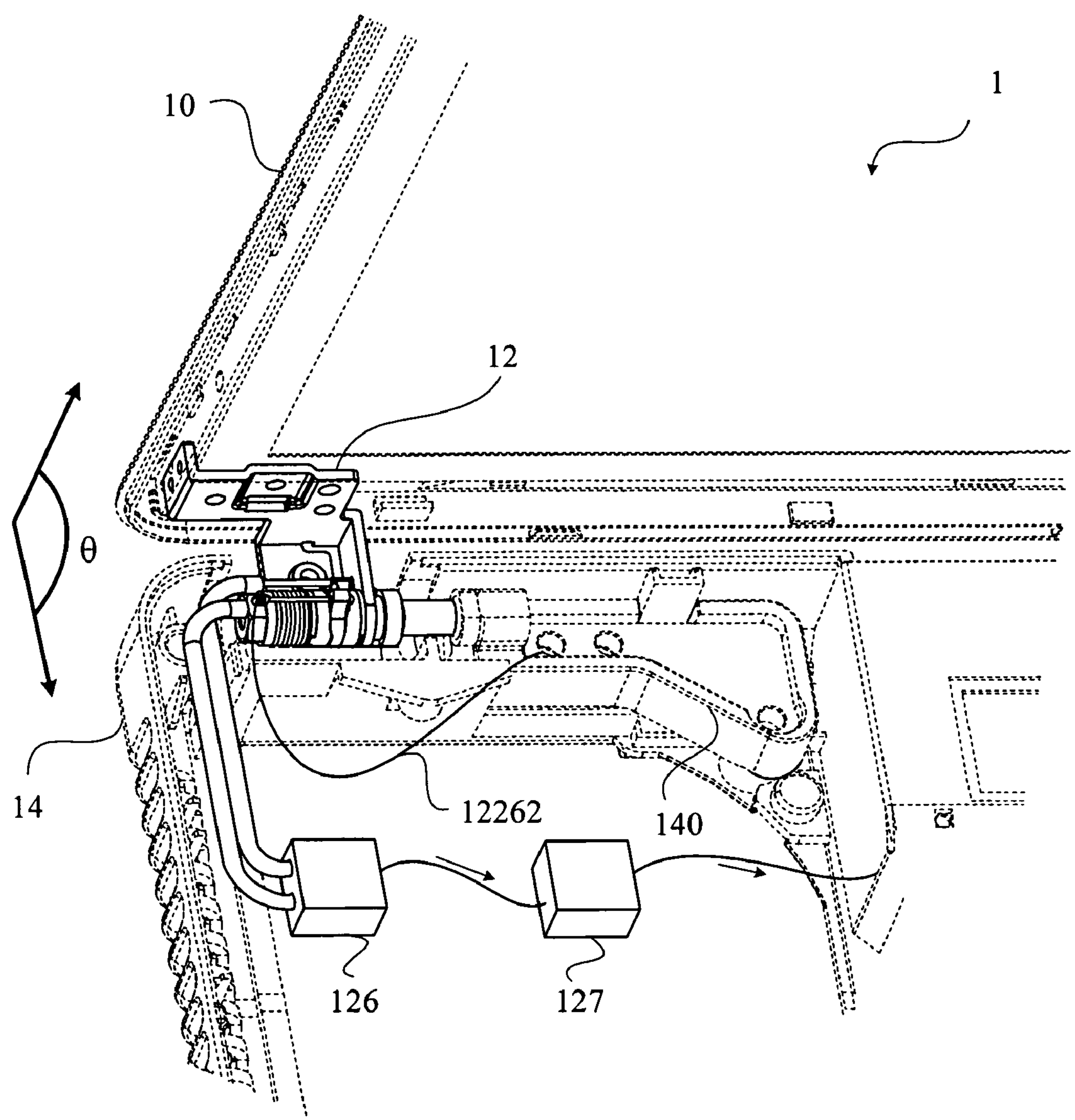
FIG. 1 is a schematic diagram illustrating the laptop according to an embodiment of the invention.

Please refer to FIG. 1. FIG. 1 is a schematic diagram illustrating the laptop 1 according to an embodiment of the invention. As shown in FIG. 1, the laptop 1 of the invention includes a monitor 10, a hinge 12, and a body 14. The body 14 accommodates main electronic elements such as a motherboard (MB), a hard disk (HD), and a central processing unit (CPU). The monitor 10 is used for presenting and showing information calculated by the main electronic elements of the body 14. The monitor 10 is pivotally connected to the body 14 via the hinge 12. When the user does not use the laptop 1, the user can push the monitor 10 to close to the body 14. Contrarily, when the user wants to use the laptop 1, the user can push the monitor 10 to rotate relatively to or away from the body 14, as shown in FIG. 1. It should be noticed that the electronic apparatus of the invention is not limited to the laptop 1, and can be an electronic apparatus with a hinge engaged to a monitor and a body, for example, a folded-type cell phone.

Figure 2:
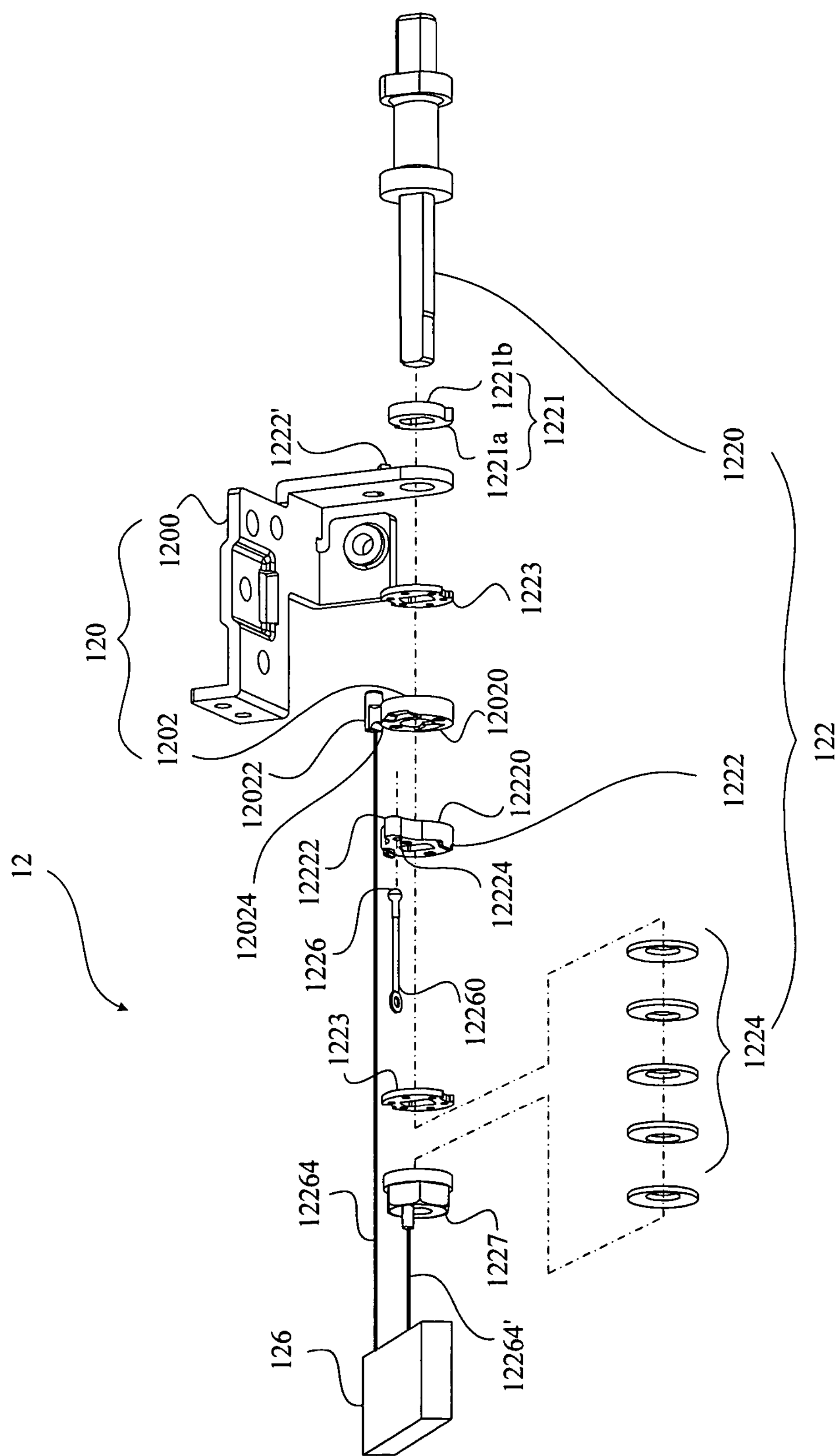
FIG. 2 is an explosion view of the hinge shown in FIG. 1.

In order to clearly show the hinge 12 in FIG. 1, please refer to FIG. 2. FIG. 2 is an explosion view of the hinge 12 shown in FIG. 1. As shown in FIG. 2, the hinge 12 of the invention includes a monitor support part 120, a body support part 122, and a sensor 126. The monitor support part 120 and the body support part 122 are respectively engaged to the monitor 10 and the body 14 of the laptop 1.

As shown in FIG. 2, the body support part 122 is pivotally connected to the monitor support part 120, the body support part 122 includes a fixed axle 1220, a stop part 1222, and an elastic washer 1224, and the amount of the elastic washer varies with the practical demand. The stop part 1222 is engaged to the fixed axle 1220, and one side of the stop part 1222 includes a second electrical connection part 12220. Besides, the flange of the stop part 1222 includes a mountain-type protrusion 12222 with a through hole 12224 thereon for accommodating the protrusion part 1226. The protrusion part 1226 is connected to a grounding bar 12260. The grounding bar 12260 is grounded via a grounding line 12262 connected to the metal mounting base 140 of the body 14, or extending the grounding bar 12260 to ground directly.

Figure 5:
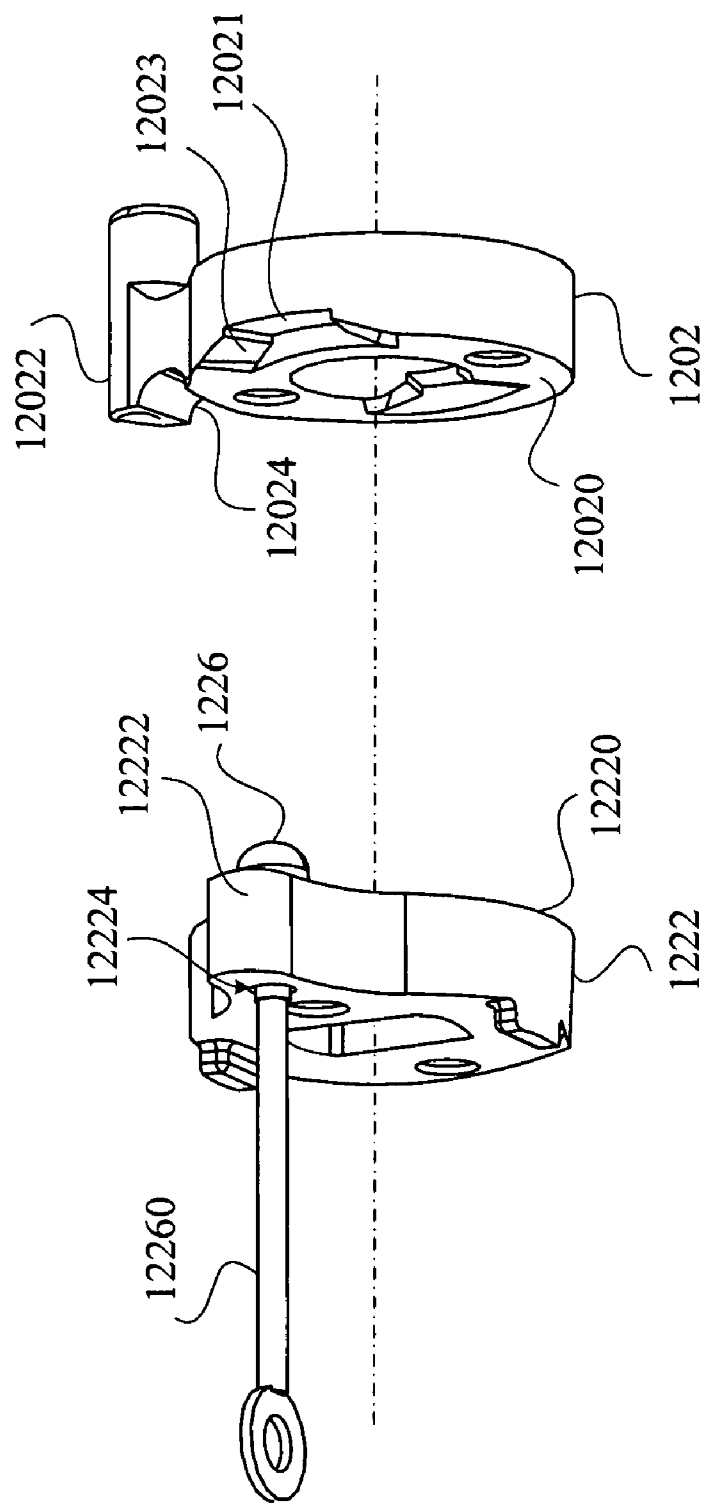
FIG. 5 is a schematic diagram illustrating the rotating part and the stop part shown in FIG. 3A.

Please refer to FIG. 2 and FIG. 5. The monitor support part 120 includes a rotating structure 1200 and a rotating part 1202, and the rotating structure 1200 can be rotatably engaged to the fixed axle 1220. One side of the rotating part 1202 includes a first electrical connection part 12020 opposite to the second electrical connection part 12220, and the rotating part 1202 is fixed on the rotating structure 1200. The elastic washer 1224 is engaged to the fixed axle 1220 and posited on the side of the stop part 1222 not including the second electrical connection part 12220. Besides, the flange of the rotating part 1202 includes a pillar 12022 and a second concave area 12024. The sensor 126 is electrically connected to the first electrical connection part 12020 and the second electrical connection part 12220 via a conducting wire 12264 and 12264' respectively. It should be noticed that the protrusion part 1226 needs to be insulated from the second electrical connection part 12220, and the electrical insulation can be done by filling or coating the through hole 12224 with an insulation object or an insulation material.

Figure 3A:
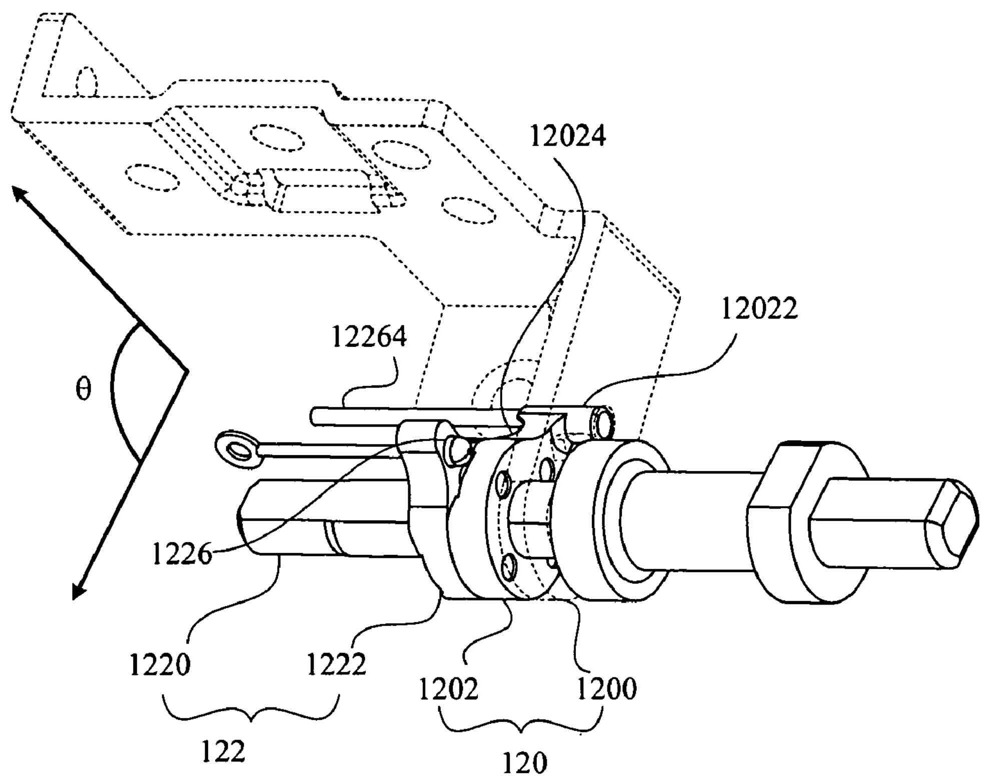
FIG. 3A is a schematic diagram illustrating the body support part and the monitor support part when the monitor is opened.
Figure 3B:
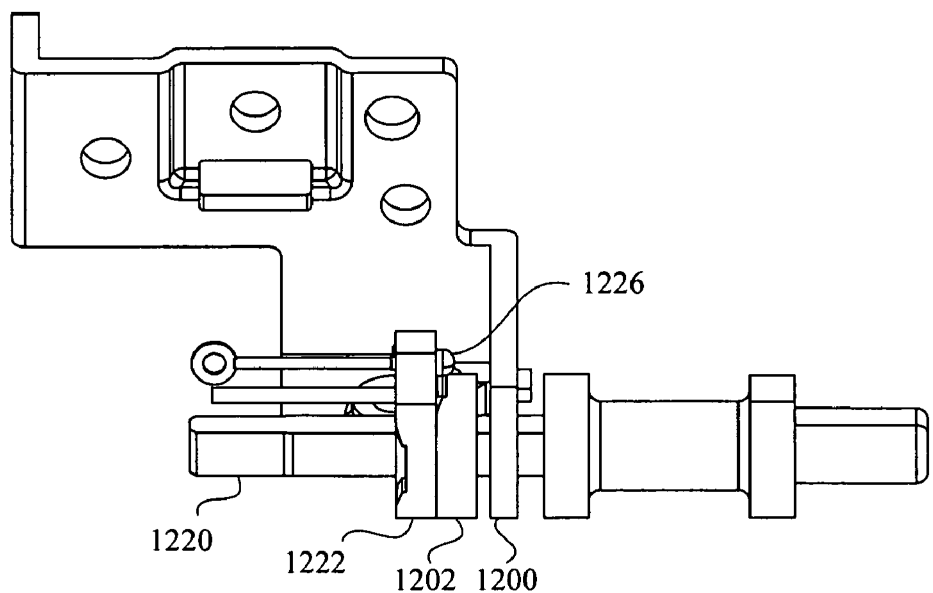
FIG. 3B is another view angle of the body support part and the monitor support part shown in FIG. 3A.
Figure 4A:
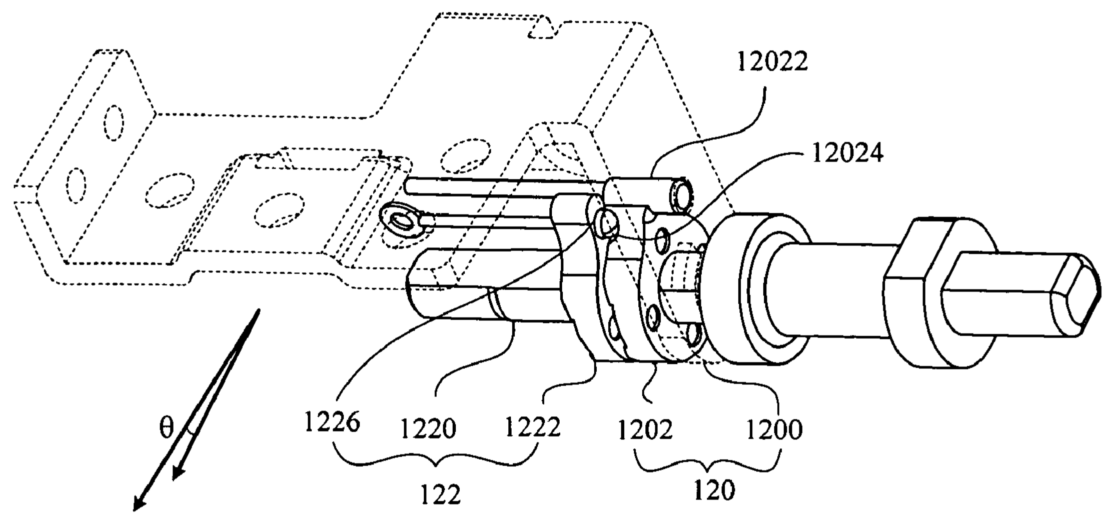
FIG. 4A is a schematic diagram illustrating the body support part and the monitor support part when the monitor is closed.
Figure 4B:
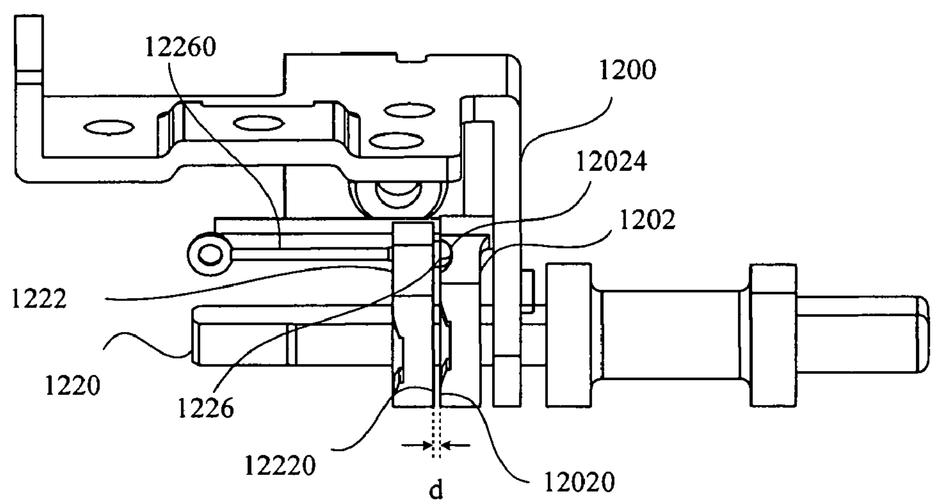
FIG. 4B is another view angle of the body support part and the monitor support part shown in FIG. 4A.

Please refer to FIG. 3A through FIG. 4B. FIG. 3A is a schematic diagram illustrating the body support part 122 and the monitor support part 120 when the monitor 10 is opened, and the angle θ shown in the diagram represents the included angle between the monitor 10 and the body 14. FIG. 3B is another view angle of the body support part 122 and the monitor support part 120 shown in FIG. 3A. FIG. 4A is a schematic diagram illustrating the body support part 122 and the monitor support part 120 when the monitor is closed. FIG. 4B is another view angle of the body support part 122 and the monitor support part 120 shown in FIG. 4A. It should be noticed that, as shown in FIG. 3A and FIG. 3B, the rotating part 1202 of the monitor support part 120 does not contact with the protrusion part 1226 embedded in the through hole 12224 of the stop part 1222. From the opened status, when the user begins to rotate the monitor 10 (refer to FIG. 1) toward the body 14, the included angle θ between the monitor 10 and the body 14 decreases. Meanwhile, the first electrical connection part 12020 of the rotating part 1202 persistently contacts with the second electrical connection part 12220 of the stop part 1222, which means that the electrical connection between the first electrical connection part 12020 and the second electrical connection part 12220 remains conduct status.

Once the rotating part 1202 is rotated relatively to the stop part 1222 to a particular position, as shown in FIGS. 4A and 4B, the second concave area 12024 of the rotating part 1202 interferes with the protrusion part 1226. Therefore, the first electrical connection part 12020 of the rotating part 1202 is forced to be separated at a distance d from the second electrical connection part 12220 of the stop part 1222 to break off the electrical connection therebetween. Then, the protrusion part 1226 slides into the second concave area 12024, and meanwhile the rotating part 1202 is electrically connected to the protrusion part 1226 via the pillar 12022 and grounded via the grounding bar 12260 or the grounding line 12262 (refer to FIG. 1).

As shown in FIG. 2, the invention further includes a wear washer 1223 and a limiting rotation washer 1221. The wear washer 1223 is used to separate elements not to contact and rub with each other directly, thus the rubbing damage of the elements can further be improved. The shape of the limiting rotation washer 1221 is similar to the combination of flanges of discs with different size (a big disc 1221*a* and a small disc 1221*b*). The rotating structure 1200 has a protrusion pillar 1222', and the protrusion pillar 1222' can slide along a part of the flange of the limiting rotation washer 1221, in other words, the protrusion pillar 1222' would slide along the flange of the small disc 1221*b* and stopped by the flange of the big disc 1221*a*. Accordingly, the rotatable angle of the rotating structure 1200 is limited, so the shape of the limiting rotation washer 1221 can be modified to limit the rotatable angle of the monitor 10. In some cases, the hinge 12 or the monitor 10 might be damaged by a non-predicted exterior force such as rotating the opened angle between the monitor 10 of the laptop more than 180 degree. Therefore, the damage possibility of the mechanism caused by over-rotation can be reduced. In addition, please refer to FIG. 5, the first electrical connection part 12020 can provide an automatic lock function via a first concave area 12021 and an inclined plate 12023 corresponding to a cam.

In fact, as shown in FIG. 2, the stop part 1222 contacts with the wear washer 1223; the wear washer 1223 contacts with the elastic washer 1224; the elastic washer 1224 contacts with a screw bolt 1227; the conducting wire 12264' of the sensor 126 is connected to the screw bolt 1227. Because the material of the wear washer 1223, the elastic washer 1224, and the screw bolt 1227 is metal, the sensor 126 can be electrically connected to the stop part 1222. In another embodiment, the conducting wire 12264' can be directly connected to the stop part 1222, so the sensor 126 can be electrically connected to the stop part 1222.

The sensor 126 can be a Hall sensor. The Hall sensor generates a magnetic field and a Hall voltage as well according to the inputted current. Further, the inputted current can be calculated from the Hall voltage. In fact, the sensor 126 of the invention can be other type of sensors capable of detecting the variation of the signal. Please refer to FIG. 1 and FIG. 2, the sensor 126 is electrically connected to the body support part 122 and the monitor support 120 respectively. When the electrical connection between the monitor support part 120 and the body support part 122 varies (e.g. from the opened monitor to be closed or from the closed monitor to be opened), the sensor 126 can correspondingly transmit the signal to the electronic controller 127 or the system, so that the electronic controller 127 can switch the monitor 10 on/off according to the signal.

Accordingly, when the monitor support part is rotated relatively to the body support part to a particularly position, the monitor support part is detached from the body support part. Therefore, the electrical connection between the monitor support part and the body support part varies at the particular position. Therefore, the sensor electrically connected to the monitor support part and the body support part would transmit an electronic signal to the controller in the computer. The controller then selectively switches the monitor off according to the electronic signal. Furthermore, the electronic apparatus of the invention can achieve a goal of selectively switching the monitor off via the hinge, and has a better appearance design.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A hinge comprising:

a first support part comprising a first electrical connection part;

a second support part pivotally connected to the first support part and comprising a fixed axle and a stop part, the stop part being engaged to the fixed axle and comprising a second electrical connection part and a protrusion part electrically grounded, the second electrical connection part being detachably contacted with the first electrical connection part, the protrusion part being insulated from the second electrical connection part; and a sensor electrically connected to the first electrical connection part and the second electrical connection part;

wherein when the first support part rotates relatively to the second support part to a predetermined position, the first electrical connection part is pushed by the protrusion part to be detached from the second electrical connection part without contacting each other, and the sensor correspondingly transmits a signal.

2. The hinge of claim 1, wherein the first support part comprises:

a rotating structure rotatably engaged to the fixed axle; and a rotating part fixed on the rotating structure comprising the first electrical connection part.

3. The hinge of claim 2, further comprising an elastic washer engaged to the fixed axle and posited on a side of the stop part, oppositing to the second electrical connection part.

4. The hinge of claim 3, further comprising a limiting rotation washer engaged between the rotating structure and the fixed axle.

5. The hinge of claim 1, wherein the sensor is a Hall sensor.

6. An electrical apparatus comprising:

a body;

a monitor; and a hinge respectively engaged to the monitor and the body, the monitor rotating relatively to the body via the hinge, the hinge comprising:

a first support part comprising a first electrical connection part;

a second support part pivotally connected to the first support part and comprising a fixed axle and a stop part, the stop part being engaged to the fixed axle and comprising a second electrical connection part and a protrusion part electrically grounded, the second electrical connection part being detachably contacted with the first electrical connection part, the protrusion part being insulated from the second electrical connection part; and a sensor, electrically connected to the first electrical connection part and the second electrical connection part;

wherein when the first support part rotates relatively to the second support part to a predetermined position, the first electrical connection part is pushed by the protrusion part to be detached from the second electrical connection part without contacting each other, and the sensor correspondingly transmits a signal to the body to switch off the monitor.

7. The electrical apparatus of claim 6, wherein the first support part of the hinge comprises:

a rotating structure rotatably engaged to the fixed axle; and a rotating part fixed on the rotating structure, comprising the first electrical connection part.

8. The electrical apparatus of claim 7, wherein the hinge further comprises a limiting rotation washer engaged between the rotating structure and the fixed axle.

9. The electrical apparatus of claim 7, wherein the hinge further comprises an elastic washer engaged to the fixed axle and posited on a side of the stop part, opposite to the second electrical connection part.

10. The electrical apparatus of claim 9, wherein the hinge further comprises a limiting rotation washer engaged between the rotating structure and the fixed axle.

11. The electrical apparatus of claim 10, wherein the electrical apparatus is a laptop.

12. The electrical apparatus of claim 6, further comprising a controller electrically connected to the sensor of the hinge, wherein when the controller receives the signal, the controller switches the monitor off.

13. The electrical apparatus of claim 6, wherein the sensor of the hinge is a Hall sensor.

14. The electrical apparatus of claim 6, wherein the monitor is engaged to the first support part of the hinge, the body is engaged to the second support part of the hinge.

15. The electrical apparatus of claim 6, wherein the electrical apparatus is a laptop.

16. An electrical apparatus comprising:

a first support part comprising a first electrical connection part;

a second support part pivotally connected to the first support part and comprising a fixed axle and a stop part, the stop part being engaged to the fixed axle and comprising a second electrical connection part and a protrusion part electrically grounded, the second electrical connection part being detachably contacted with the first electrical connection part, and the protrusion part being insulated from the second electrical connection part; and a sensor, electrically connected to the first electrical connection part and the second electrical connection part;

wherein when the electrical apparatus is in an opened status, the first electrical connection part contacts with the second electrical connection part, and when the electrical apparatus is in a closed status, the first electrical connection part is forced to be separated from the second electrical connection part via the protrusion part, and the sensor correspondingly transmits a signal.

17. The electrical apparatus of claim 16, wherein the first support part comprises a concave area, and when the electrical apparatus is in the closed status, the protrusion part slides into the concave area.

* * * * *